March 9, 1954 R. C. SIGHTS 2,671,283
SCOOPING APPARATUS
Filed Feb. 10, 1950 2 Sheets-Sheet 1

Inventor

Robert C. Sights

By Clarence A. O'Brien
and Harvey B. Jacobson
Attorneys

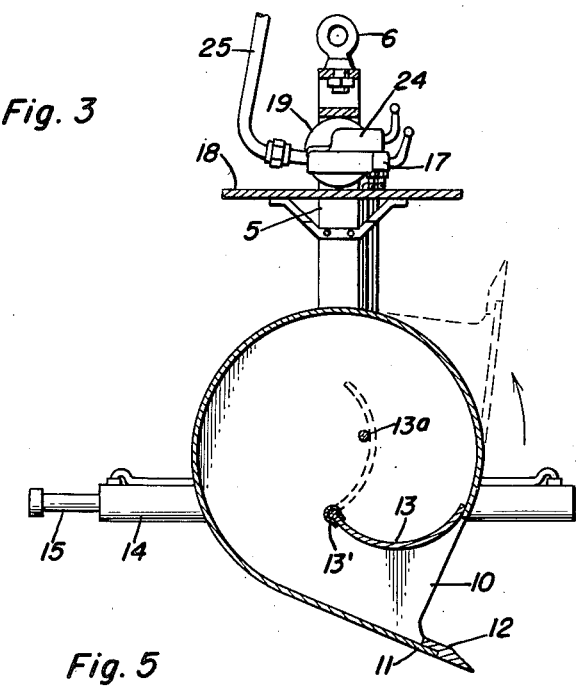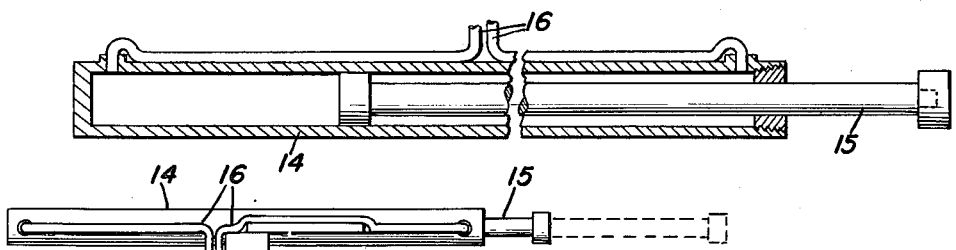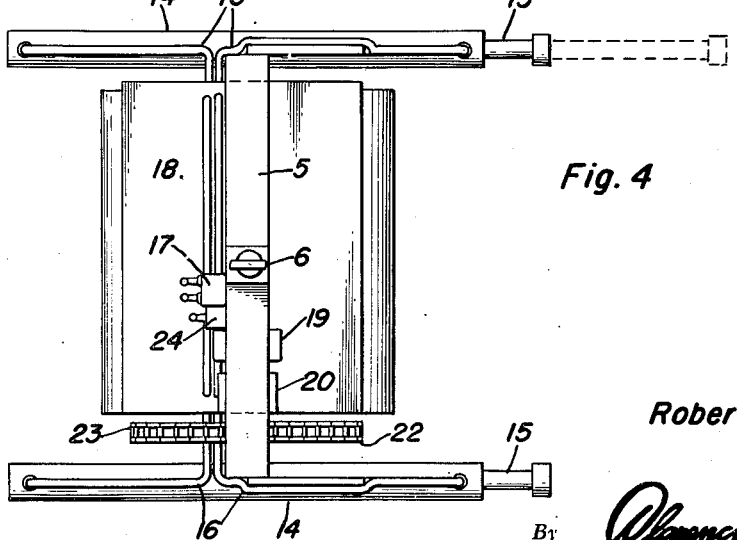

Patented Mar. 9, 1954

2,671,283

UNITED STATES PATENT OFFICE 2,671,283

SCOOPING APPARATUS

Robert C. Sights, Searchlight, Nev.

Application February 10, 1950, Serial No. 143,435

3 Claims. (Cl. 37—118)

This invention relates to a scooping apparatus especially adapted for use in excavating earth in the formation of wells and others shafts in the ground, or for removing mud and the like from the bottoms of such wells or shafts.

The primary object of the present invention is to provide an apparatus of the above kind including a scoop or bucket adapted to be suspended in the well or shaft from a hoist line and mounted for rotation about a horizontal axis, and power operated means to rotate the scoop to effect the excavating operation.

Another object of the invention is to provide an apparatus of the above kind which is comparatively simple in construction and highly efficient in operation.

A more specific object is to provide an apparatus of the above kind including a bail, a rotary scoop journaled in the bail, said bail being adapted for connection with a hoist line, a platform carried by the bail above the scoop and adapted to accommodate an attendant, a motor mounted on the platform and operatively connected to the scoop for rotating the latter, and means operable by the attendant from his position on the platform to control the operation of the motor.

A still further object is to provide an apparatus of the above kind including power operated jacks mounted on the bail and adapted to force the scoop laterally into the material to be excavated, means being provided which is operable by the attendant from his position on the platform to control the operation of the jacks.

The exact nature of the present invention, as well as other objects and features thereof, will become apparent from the following description when considered in connection with the accompanying drawings, in which:

Figure 3 is a vertical section taken on the line 3—3 of Figure 2;

Figure 4 is a top plan view of the apparatus;

Figure 5 is a view of one of the jacks, partly broken away and in longitudinal section.

Figure 1:
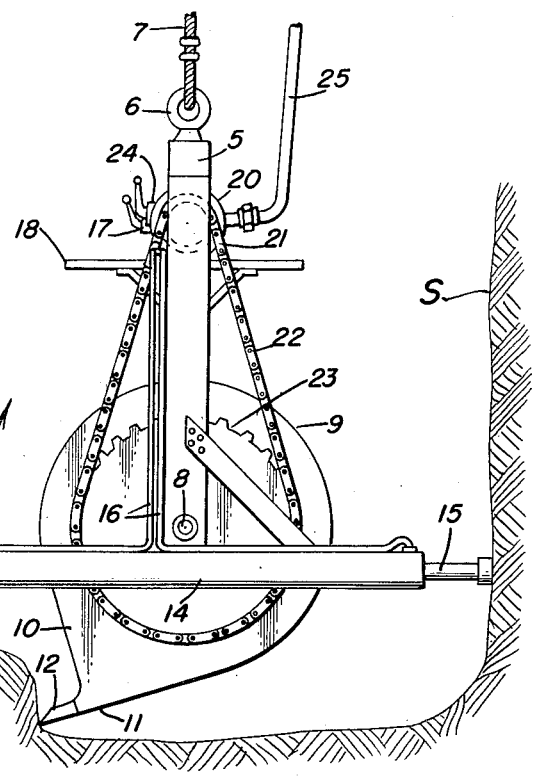
Figure 1 is a side elevational view of an apparatus constructed in accordance with the present invention and showing the apparatus in use for excavating material at the bottom of a shaft.
Figure 2:
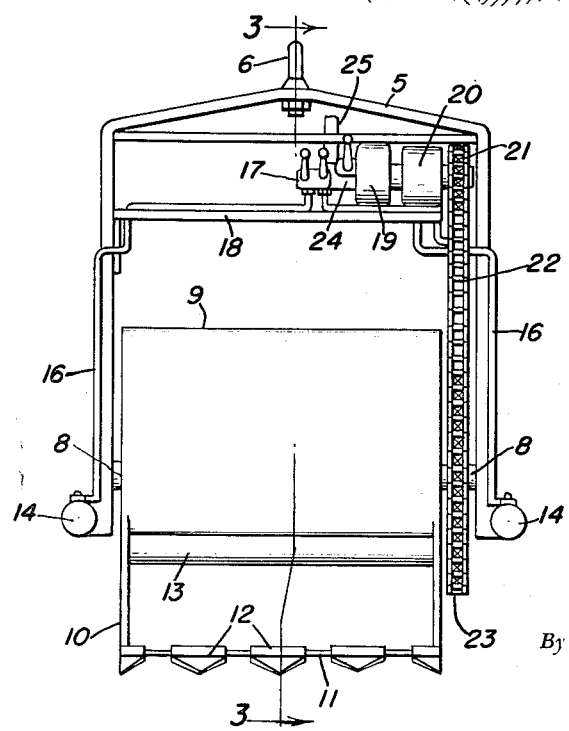
Figure 2 is a front elevational view of the apparatus shown in Figure 1.

Referring in detail to the drawings, 5 indicates a bail or inverted U-shaped frame having an eye member 6 at the top for connection with a hoist line. Journaled at 8 in the ends of bail 5, for rotation about a horizontal axis, is an excavating scoop or bucket 9 which is closed at the sides and has a peripheral wall 9' of general scroll or spiral form. The scoop has a peripheral mouth 10 through which material passes into and out of the scoop, said mouth having an outer lip 11 on which digging teeth 12 are secured. A hinged gate 13 forms a continuation of wall 9' and, when closed, partially closes the mouth 10 and contacts the inner end of said wall 9' at the inner side of the latter. This gate is hinged at 13' to swing inwardly to open position about an axis parallel with the axis of rotation of the scoop, and a stop 13a is provided to limit the inward movement of said gate. In practice, the gate 13 opens by gravity when at the top of the scoop during rotation of the latter, thereby enabling the scoop to load better and more completely.

The horizontal cylinders 14 of conventional pneumatic jacks may be fixed to the ends of bail 5, said jacks being disposed at and parallel with the sides of scoop 9 and having piston rods 15 projectable rearwardly of the scoop. The jacks are double acting in that their piston rods are projectable and retractable by air under pressure which may be selectively admitted to either desired end of the jack cylinders through lines 16 under control of a multiple valve 17.

Rigidly mounted within the upper portion of bail 5 is a horizontal platform 18 on which a compressed air or other motor 19 and a reduction gearing 20 are mounted, said reduction gearing having a driven shaft on which is secured a small sprocket wheel 21. An endless sprocket chain 22 passes around the sprocket wheel 21 and a larger sprocket wheel 23 secured on one trunnion of the scoop. The scoop is rotatably driven by motor 19 through reduction gearing 20 and the chain and sprocket gearing. Compressed air may be supplied to valve 17 and the control valve 24 of motor 19 through a supply line 25 from a suitable source at the surface. The platform 18 is adapted to support an attendant, and the valves 17 and 24 are readily accessible to him while on the platform.

In operation, the apparatus is lowered into the shaft or well S with the attendant positioned upon the platform 18, and the scoop is then driven in the direction of the arrow shown in Figure 1 so as to cause the teeth 13 to dig material from the bottom of the shaft or well and direct it into the scoop through the mouth 10 of the latter. By operating valve 17, the jacks may be caused to force the scoop laterally in a forward direction, the piston rods 15 being projected while bearing against the wall of the shaft or well behind the scoop. When the scoop is full, the valve 24 may be operated to stop the motor 19 with the scoop in the load elevating position indicated by dotted lines in Figure 3, wherein the scoop is disposed with its mouth substantially uppermost to hold the load therein. The pistons 15 are retracted when the device is hoisted to the surface, whereupon the scoop is rotated backwardly so as to discharge the load therefrom.

From the foregoing description, it is believed that the construction, operation and advantages of the present invention will be readily understood and appreciated by those skilled in the art. Modifications and changes in details of construction are contemplated, such as fairly fall within the spirit and scope of the invention as claimed.

Having described the invention, what is claimed as new is:

1. A scooping apparatus comprising a bail, a rotary scoop journaled in the lower portion of said bail for rotation about a horizontal axis, said scoop including side walls and a substantially spiral shaped connecting wall extending between and fixed to said side walls, the ends of said connecting wall terminating spaced from one another, one of said ends extending slightly beyond the periphery of said side walls to form a lip and the other of said ends terminating flush with the periphery of said side walls thereby providing a mouth between said ends for the scoop, a gate hingedly secured to and extending between said side walls within the interior of said scoop, said gate forming a substantially spiral continuation of said connecting wall and having its free end abutting the inner edge of said other end of said connecting wall.

2. The combination of claim 1, wherein a stop is secured within said scoop to limit movement of said gate away from said connecting wall, said gate maintaining material within the scoop as the scoop is rotated in one direction.

3. A scooping apparatus comprising a bail, a rotary scoop journaled in the lower portion of said bail for rotation about a horizontal axis, said scoop including side walls and a substantially spiral shaped connecting wall extending between and fixed to said side walls, the ends of said connecting wall terminating spaced from one another, one of said ends extending slightly beyond the periphery of said side walls to form a lip and the other of said ends terminating flush with the periphery of said side walls thereby providing a mouth between said ends for the scoop, a gate hingedly secured to and extending between said side walls within the interior of said scoop, said gate forming a substantially spiral continuation of said connecting wall and having its free end abutting the inner edge of said other end of said connecting wall, power operated means for rotating said scoop, a horizontal platform rigidly mounted in the upper portion of the bail, said power operated means including a motor mounted on said platform and adapted to be operated from said platform.

ROBERT C. SIGHTS.

References Cited in the file of this patent

UNITED STATES PATENTS

| Number | Name | Date |
|---|---|---|
| 575,874 | Calhoun | Jan. 26, 1897 |
| 954,936 | Crenshaw | Apr. 12, 1910 |
| 1,662,904 | Schnyder | Mar. 20, 1928 |
| 1,822,181 | Wagner | Sept. 8, 1931 |
| 1,824,989 | Fundom | Sept. 29, 1931 |
| 2,095,759 | Maloon | Oct. 12, 1937 |
| 2,129,158 | Williams | Sept. 6, 1938 |
| 2,286,765 | Settersten | June 16, 1942 |
| 2,393,432 | Turner | Jan. 22, 1946 |
| 2,411,685 | Holland | Nov. 26, 1946 |

FOREIGN PATENTS

| Number | Country | Date |
|---|---|---|
| 379,297 | Great Britain | Aug. 24, 1932 |
| 553,954 | Great Britain | June 11, 1943 |